Figure 1:
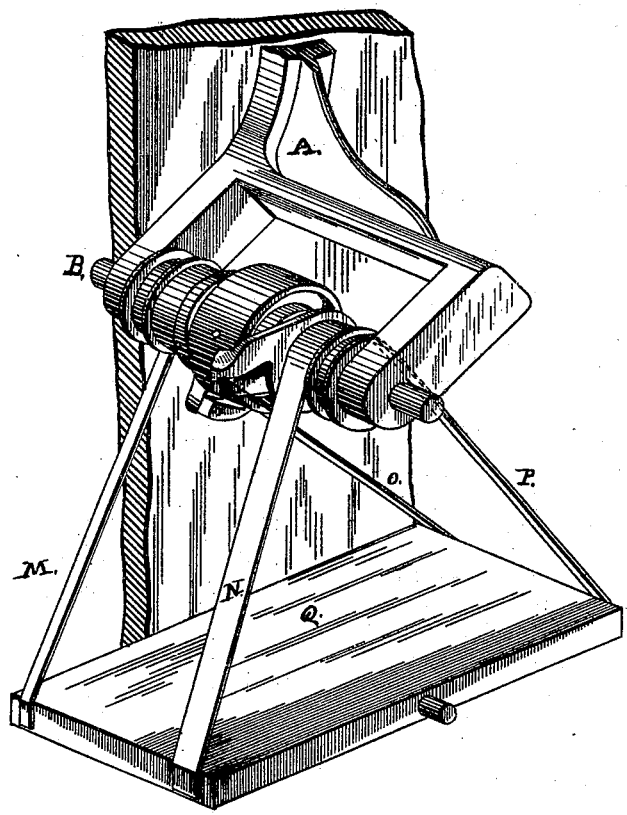

G. M. HOAG.
DEVICES FOR COMMUNICATING FOOT-POWER.

No. 179,454. Patented July 4, 1876.

WITNESSES.                                   INVENTOR.

UNITED STATES PATENT OFFICE.

GEORGE M. HOAG, OF PROVIDENCE, RHODE ISLAND.

IMPROVEMENT IN DEVICES FOR COMMUNICATING FOOT-POWER.

Specification forming part of Letters Patent No. 179,454, dated July 4, 1876; application filed April 19, 1876.

*To all whom it may concern:*

Be it known that I, GEO. M. HOAG, of Providence, in the State of Rhode Island, have invented a new and useful Device for Communicating Foot-Power; and I do hereby declare that the following specification, taken in connection with the drawing making a part of the same, is a full, clear, and exact description thereof.

Figure 2:
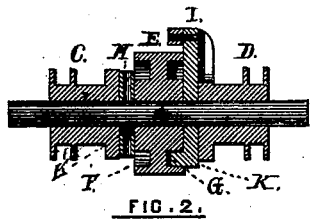
Figure 3:
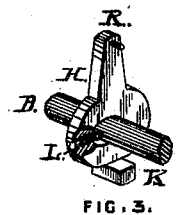

Figure 1 is a view in perspective. Fig. 2 is a longitudinal section through center of shaft. Fig. 3 is a detached part of the same.

The object of my invention is to communicate power for various purposes to a pulley-shaft, in such a manner that there will be no dead-center, and that, upon motion being imparted to the treadle, the shaft will invariably be caused to rotate in the same direction; and consists in the device hereinafter described.

A is a suitable bearing for the shaft B, upon which are two double loose pulleys, C D, and a fixed pulley, E. The fixed pulley E is provided upon each side with an annular groove, F G. The inner sides of the loose pulleys C D have a projecting arm, to the extremity of which are pivoted levers H I, which may wholly or partially surround the shaft B, and are provided with longitudinal projections K K', which extend into the annular grooves F G. The levers H I, as shown in Fig. 3, have oblong centers fitting loosely to the shaft, and have an interior spring, L, the tendency of which is to maintain them in a position eccentric to the shaft. The double pulleys C D are rotated by straps M N O P, attached to the treadle Q.

When motion is imparted to the treadle Q by the foot, the projection or pawl K will catch the flange of the fixed pulley E and carry it forward a half revolution; at the same time the pawl K' is moving back upon the other side of the pulley to repeat the operation with the reverse of the treadle. Thus the fixed pulley E, and, consequently, the shaft B, are kept in constant rotation.

The levers H I being thrown off from the center by the interior springs L, and the pressure coming upon the long arm R, Fig. 3, has a tendency to remove the lever still farther from the shaft B, which forces the shaft-arm to carry the pulley and shaft forward, When the lever on one side has carried forward the pulley its usual distance the lever on the other side takes hold in a like manner, the first lever begins its backward movement, the pressure on its long arm being exerted in the opposite direction, which, instead of forcing the pawl into contact with the flange of the pulley E, has a tendency to, and does, release it therefrom as the lever is pressed toward the center.

What I claim as my invention, and desire to secure by Letters Patent, is—

In combination with the shaft B, the loose double pulleys C D, and fixed pulley E, the latter grooved laterally, as described, and arranged to operate with the levers H I, having projections K K', substantially as and for the purpose specified.

GEO. M. HOAG.

Witnesses:
G. A. CARPENTER, Jr.,
WALTER B. VINCENT.